United States Patent [19]
Lloyd

[11] Patent Number: 5,067,792
[45] Date of Patent: Nov. 26, 1991

[54] METHOD AND APPARATUS FOR INTERFACING OF HOLOGRAPHIC AND ELECTRONIC DATA

[76] Inventor: O. H. Perry Lloyd, 310 B San Jose Ave., Capitola, Calif. 95010

[21] Appl. No.: 584,524

[22] Filed: Sep. 18, 1990

[51] Int. Cl.$^5$ .............................. G02B 6/04; G03H 1/22
[52] U.S. Cl. ........................................... 359/32; 358/2; 359/1; 359/34; 385/115; 385/121
[58] Field of Search ................ 350/96.24, 3.6, 3.61, 350/3.68, 3.69, 3.8, 3.83, 3.84, 3.85; 250/227.11, 227.14, 227.2, 227.29; 358/2, 90

[56] References Cited

U.S. PATENT DOCUMENTS

| | | | |
|---|---|---|---|
| 3,884,553 | 5/1975 | Graser, Jr. | 350/162 |
| 4,415,225 | 11/1983 | Benton et al. | 350/3.84 |
| 4,589,723 | 5/1986 | Doi et al. | 350/3.83 |
| 4,989,071 | 1/1991 | Hopwood | 350/3.83 |

FOREIGN PATENT DOCUMENTS

| | | | |
|---|---|---|---|
| 0162219 | 8/1985 | Japan | 350/96.24 |
| 0096618 | 4/1988 | Japan | 350/96.24 |

*Primary Examiner*—Georgia Epps

[57] ABSTRACT

An apparatus for interfacing holographic and electronic data comprises an input/output port for the interfacing of a holographic wavefront interference pattern and an electronic array capable of producing digital electronic information from a holographic wavefront input and for converting electronic information into holographic information using optical fibers, sensors, and optical switches. In one embodiment a plurality of optical fibers having a small end and a large tapered end are operably combined with a plurality of optical sensors wherein each of said optical sensors provide a digital signal of 1 if lit and a digital signal of 0 if unlit.

19 Claims, 2 Drawing Sheets

METHOD AND APPARATUS FOR INTERFACING OF HOLOGRAPHIC AND ELECTRONIC DATA

BACKGROUND OF THE INVENTION

1. Field Of The Invention

The present invention relates in general to methods and apparatuses for interfacing holographic and electronic data, especially to methods and apparatuses for reading a holographic wavefront and translating the wavefront into a digital electronic signal.

2. Description Of Prior Art

Holography is a form of three-dimensional photography in which coherent light is used in combination with ordinary photographic plates to produce images which can be viewed in three dimension without special optical equipment. Preparation of the hologram involves the channeling of the coherent light to illuminate both the subject and the photographic plate. An interference pattern is produced on the photographic plate which shows no resemblance to the original until it is developed and illuminated from behind by similar coherent light. The process was discovered in the late 1940s, and with the advent of the laser which provides a highly coherent light source, many significant advances have been made in this field.

The crucial feature of coherent waves that is essential to holography is that two or more intersecting coherent wave trains can from standing wave patterns. When two trains of coherent light waves intersect in a given region, there will be places in that region where the electric field values add up to a greater value that either wave train alone. The will also be regions where the electric field values subtract. At the area of intersection of such light trains, a definite pattern of light and dark areas is present.

A characteristic of interference patterns of periodic coherent waves is that this spatial overlap of light intensity remains fixed and constant while the waves overlap. This is referred to as a standing wave pattern. Exposure of a photographic plate in this region of overlap leads to a hologram.

The present invention is a method and apparatus for reading a holographic wavefront and translating this wavefront into a digital electronic signal, and for propagating the same or a different wavefront from such a signal. Conventionally, a holographic wavefront is produced by the interference of a coherent light reference beam with an object split from the same laser emission and modified by interaction with the object or with the process being holographed.

Heretofore, methods and apparatuses to record the resulting wavefront rely on projecting the wavefront onto a recording medium of sufficient definition to record the resulting interference pattern. The interference pattern consists of bright regions where the two beam's wavefronts interfere constructively with one another and dark regions where the waves interfere destructively and cancel each other. Such regions are referred to as fringes. Such fringes range from almost parallel to the recording medium surface, as in the case of a reflection hologram, to essentially perpendicular to it in the case of a transmission hologram. It is with an interference pattern of the latter variety with which the current invention is envisioned to have the most ready application.

Conventional approaches to the recording an interference pattern utilize a wide variety of light sensitive emulsions. In the case of a transmission hologram the holographic wavefront can be reconstructed by introducing a display beam which corresponds in both angle of incidence and wave length to the original reference beam, which is projected onto the holographic storage medium. Typically, the image bearing wavefront is then reconstructed from the diffraction caused by the display beam's passage through the stored interference fringes. The image produced is three-dimensional and possesses a very high information content.

A number of significant limitations arise from such conventional approaches which greatly limit and restrict holographic application. Of primary significance is that storage and reproduction mediums are fixed photo-chemical processes. This severely restricts the reproduction of holograms and limits them to a single hologram per recording medium per cycle and, for all practical purposes, restricts holographic reproductions to those that can produced by the mechanical means described above. Though computers can, and have been applied to compose fringe patterns of hypothetical object wave fronts, and holographic television has been proposed, there is, until the instant invention, no practical and efficient means of interfacing these or any other electrical devices, with the actual light waves.

SUMMARY OF THE INVENTION

It is desirable, and an object of this invention to provide a method and apparatus that can input a holographic wavefront interference fringe and translate it into electrical information.

It is another object of the invention to provide a method and apparatus whereby a set of electrical information can be translated into a holographic wavefront.

Briefly, the present invention is practiced in one form by the introduction of a wavefront interference fringe produced in a conventional manner, into the fused end of a plurality of discrete optical fibers of a sufficient packing density to provide a sampling ratio sufficient to apprehend a configuration of said wavefront interference fringe. A plurality of optical sensors corresponding to said optical fibers translate a state or condition of each fiber into an electrical signal. For example, when the point that a particular fiber is sampling is a point of constructive interference and it is lit thereby an electrical digital signal of 1 is outputted. Alternatively, if it is sampling a point of destructive interference and it is unlit an electrical digital signal of 0 is outputted. Similarly, a holographic wavefront is produced from an electronic signal utilizing a display beam corresponding to a reference beam in coherence and wavelength but reversed in direction of propagation using the same plurality of discrete optical fibers but utilizing a plurality of optical switches in the same location as said optical sensors that fulfilled a corresponding function in the converse mode.

Further objects and advantages will be apparent from a consideration of the ensuing description and accompanying drawing.

Figure 1:
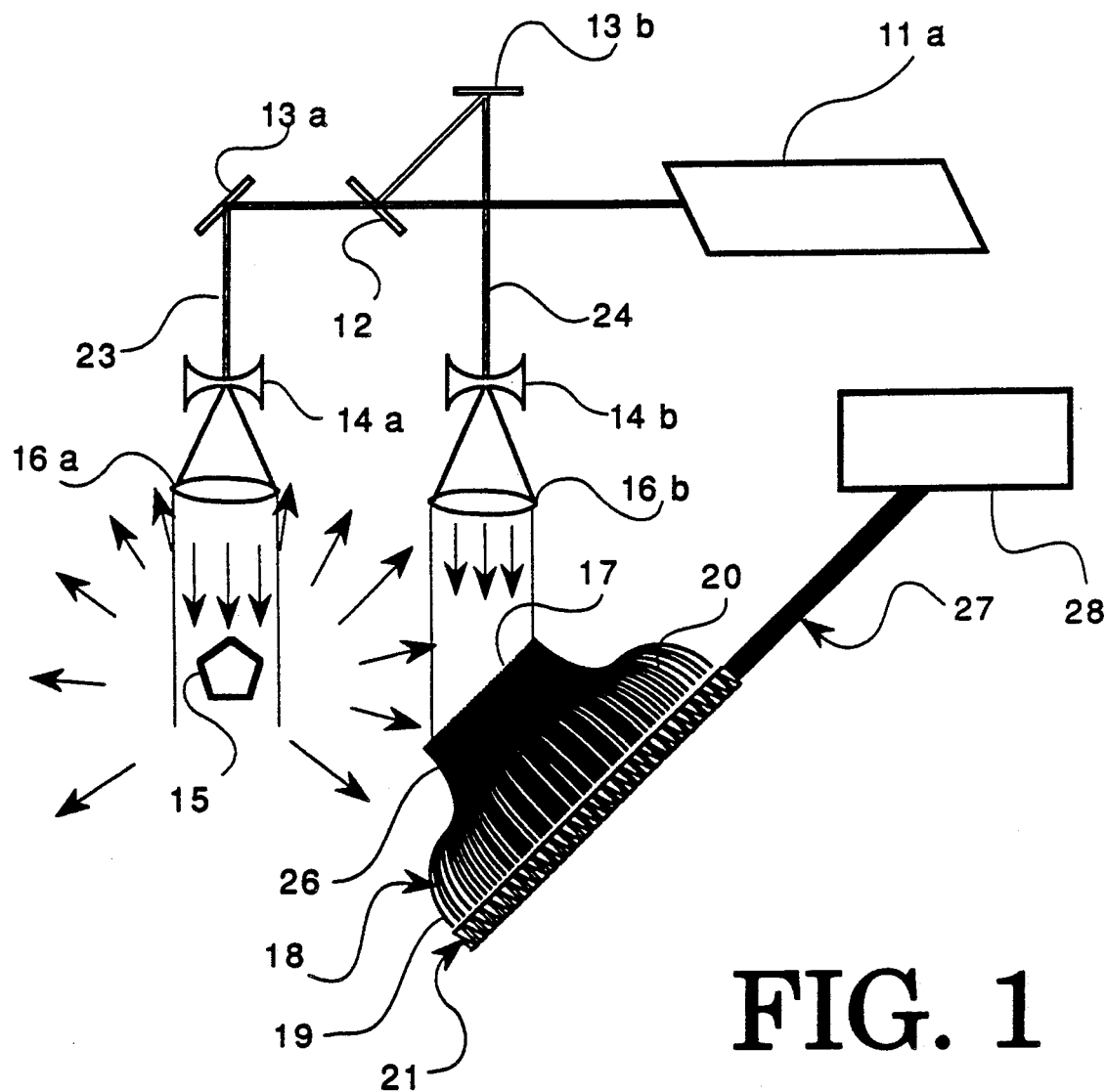
FIG. 1 shows an apparatus for interfacing holographic and electronic data according to the invention.

DRAWING REFERENCE NUMERALS 11a laser
11b display laser
12 beam splitter
13a mirror
13b mirror
14a beam spreader
14b beam spreader
15 object
16a collimating lens
16b collimating lens
16c display beam collimating lens
17 input/output surface
18 taper
19 large end of taper
20 optical fiber
21 optical sensor/optical switch addressable array
23 object beam
24 reference beam
25 display beam
26 small end of taper 18
27 electrical leads
28 digital electrical device

DETAILED DESCRIPTION OF THE PREFERRED EMBODIMENT

FIG. 1 shows an apparatus for interfacing holographic and electronic data according to the preferred embodiment of the invention. A holographic interference wavefront is created in a conventional manner using laser 11a and display laser 11b, beam splitter 12, mirrors 13a and 13b, beam spreaders 14a and 14b, collimating lens 16a and 16b, display collimating lens 16c, with object beam 23, object 15, and reference beam 24 illustrated in FIG. 1. Electrical leads 27 and a digital electrical device 28 are also illustrated. The holographic interference wavefront is projected onto an input-output surface 17 comprising a fused fiber optical taper 18 having a small end 26 and a large end 19. The large end 19 of fused fiber optical taper comprises a plurality of individually addressable optical fibers 20 each having an optical sensor 21 in operable combination therewith. The preferred optical sensor is a photo-diode coupled to a transistor due to the high response speed of such configuration, but may be otherwise, such as a photo-transistor or photo-conducting cells. It is only necessary to have a photo-reactive substance, such as silicon, cadmium sulfate or cadmium selenide which act as a sensing medium, and which can indicate with an electrical signal the condition, either lit or unlit, of the particular fiber to which it is attached.

In transmission holograms, the size of the fringe's features is usually on the order of approximately one micron. The holographic input-output interface must necessarily be of a corresponding order of definition. Most conventional optical fibers are commonly several times that size so it is a preferred method for achieving a sufficient density to utilize a fused optical fiber lens element or fused fiber optical taper 18 as illustrated in FIG. 1. Use of such taper results in the small end 26 functioning as a holographic interface and the large end 19 as individually addressable elements of an electronic interface apparatus.

Figure 2:
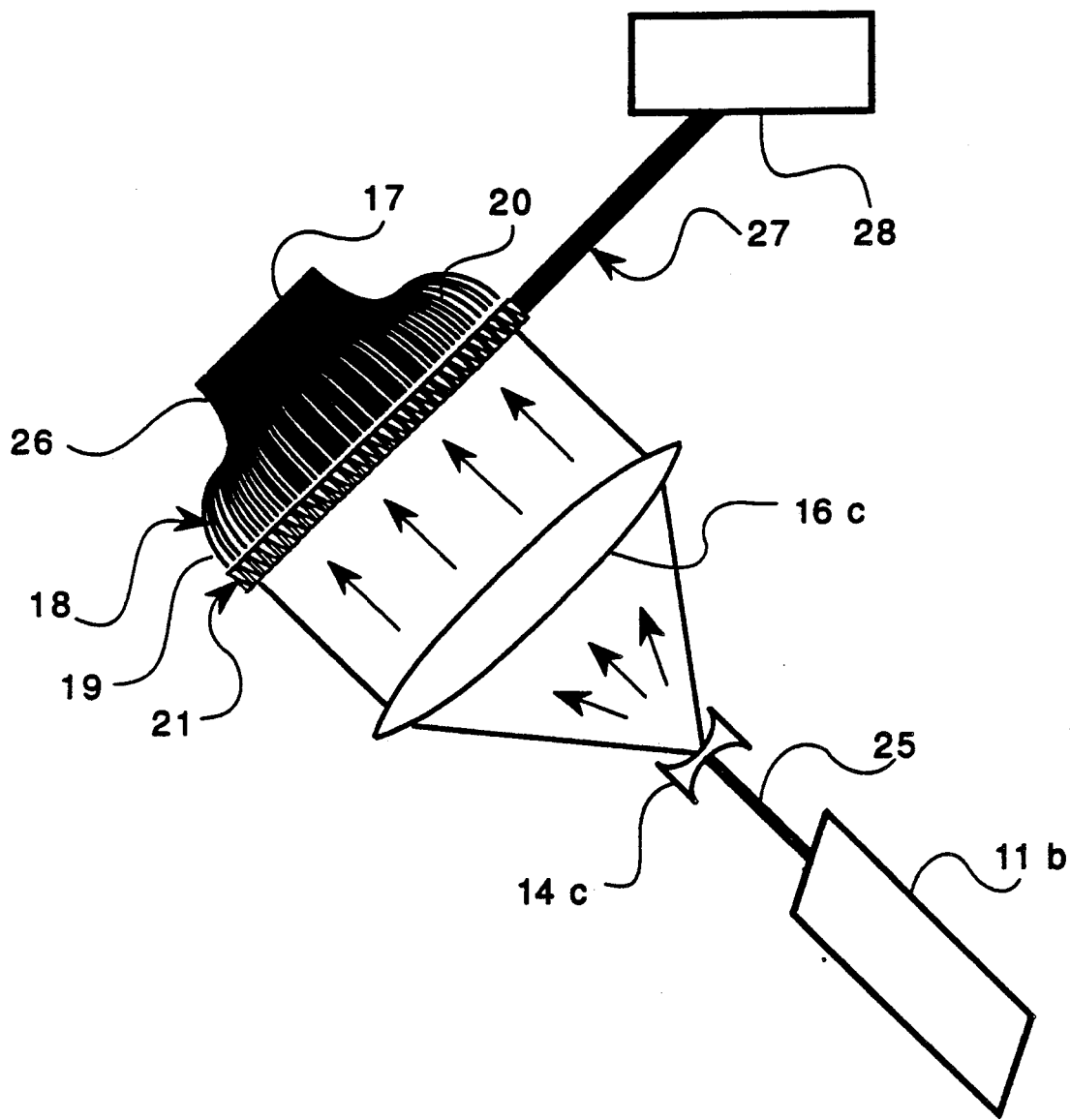
FIG. 2 shows a perspective view of such apparatus configured in a light output mode.

In a light output or reverse mode, illustrated in FIG. 2, production of a holographic wavefront is achieved by light introduced into said apparatus from a reverse direction, preferably from a laser. The light enters each individual fiber through an optical switch 21 which is preferably an electrically reactive substance such as a liquid crystal. Optical switch 21 is utilized in this mode rather than optical sensor 21 that was utilized in reading the wavefront in the light input mode. To reconstruct any particular wavefront the switches are utilized to create a desired fringe pattern by blocking the laser light traveling on the fibers serving the points corresponding to dark portions of the pattern and allowing the light to pass on the fibers serving points corresponding to lit portions of the pattern.

Accordingly an addressable array of sensors and switches 21 having light sensing switching capabilities superimposed on the large end 19 of taper 18 so that each individual optical fiber 20 has a corresponding pixel achieves an efficient means for interfacing holographic and electronic data.

While what has been described is considered to be a preferred embodiment of the invention, variations and modifications therein will occur to those skilled in the art once they become acquainted with the basic concepts of this invention. Therefore it is intended that the appended claims should be construed to include not only the preferred embodiment, but all such variations and modifications as fall within the true spirit and scope of the invention.

I claim:

1. An apparatus for interfacing electronic and holographic data, comprising:
   holographic generating means for generating a wavefront interference fringe,
   transmission means for light guiding to which said wavefront interference fringe is directed,
   sensing means and switching means for sensing, translating, and controlling the condition of said transmission means.

2. The apparatus of claim 1 wherein said transmission means comprise a plurality of optical fibers.

3. The apparatus of claim 2 wherein said sensing means comprise a plurality of optical sensors, in operable combination with said optical fibers and said switching means.

4. The apparatus of claim 2 wherein each of said plurality of optical fibers has a large end and a small end, together comprising a fused optical taper.

5. The apparatus of claim 3 wherein said plurality of optical sensors comprise a photo-diode.

6. The apparatus of claim 3 wherein said optical sensors provide an electronic digital signal of 1 if lit.

7. The apparatus of claim 2 wherein each of said optical sensors provide an electronic signal of 0 if unlit.

8. An apparatus for translating electronic data into holographic data, comprising:
   a coherent light source,
   transmission means for transmitting said coherent light source,
   switching means for switching on and off portions of said coherent light transmitted through said transmission means in accordance with an electrical signal thereby constructing and outputting a pattern with dark and radiant areas corresponding to a holographic fringe pattern.

9. The apparatus of claim 8 wherein said transmission means comprises a plurality of optical fibers.

10. The apparatus of claim 9 wherein each of said plurality of optical fibers has a large end and a small end, said large end comprising a fused optical taper.

11. The apparatus of claim 8 wherein said switching means comprises an electrically reactive substance.

12. The apparatus of claim 8 wherein said electrically reactive substance comprises a liquid crystal.

13. An apparatus for translating holographic data into electronic data, comprising:
   holographic generating means for generating a wavefront interference fringe,
   transmission means for light guiding to which said wavefront interference fringe is directed, sensing means for sensing and translating a condition of said transmission means.

14. The apparatus of claim 13 wherein said transmission means comprise a plurality of optical fibers.

15. The apparatus of claim 13 wherein said sensing means comprise a plurality of optical sensors.

16. The apparatus of claim 13 wherein each of said plurality of optical fibers has a large end and a small end, comprising a fused optical taper.

17. The apparatus of claim 15 wherein each of said plurality of optical sensors comprise a photo-diode.

18. The apparatus of claim 15 wherein each of said plurality of optical sensors provide a digital signal of 1 if lit.

19. The apparatus of claim 14 wherein each of said optical sensors provide a digital signal of 0 if unlit.

* * * * *